(12) United States Patent
Kaku

(10) Patent No.: US 6,293,890 B1
(45) Date of Patent: Sep. 25, 2001

(54) BRAKE SYSTEM FOR VEHICLES

(75) Inventor: Hidetoshi Kaku, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/541,984

(22) Filed: Apr. 3, 2000

(30) Foreign Application Priority Data

Apr. 8, 1999 (JP) .................................................. 11-101251

(51) Int. Cl.⁷ .................................................. F16H 48/22
(52) U.S. Cl. .......................................... 475/230; 188/71.5
(58) Field of Search .................................. 188/71.5, 71.6; 475/224, 230, 248, 900; 192/218, 223.3

(56) References Cited

U.S. PATENT DOCUMENTS

| | | | |
|---|---|---|---|
| 2,025,098 | * 12/1935 | Dudick | 188/171 |
| 3,707,207 | * 12/1972 | Kondo | 188/71.5 |
| 3,772,940 | * 11/1973 | Ohtsuka et al. | 74/768 |
| 3,907,073 | * 9/1975 | Harrison | 188/71.2 |
| 4,294,334 | * 10/1981 | Shinoda et al. | 188/18 A |
| 4,876,921 | * 10/1989 | Yasui et al. | 74/710.5 |
| 5,007,886 | * 4/1991 | Holmquist et al. | 475/231 |
| 5,009,290 | * 4/1991 | Harada et al. | 188/71.5 |
| 5,484,347 | * 1/1996 | Holmquist | 475/231 |
| 5,988,326 | * 11/1999 | Sommer | 188/71.5 |
| 6,182,800 | * 2/2001 | Mochizuki et al. | 188/71.5 |

FOREIGN PATENT DOCUMENTS 59-130791    7/1984 (JP) .

* cited by examiner

Primary Examiner—Robert Oberleitner
Assistant Examiner—Melody M. Burch
(74) Attorney, Agent, or Firm—Oliff & Berridge, PLC

(57) ABSTRACT

The invention relates to a brake system for reducing the number of brake parts, a brake installing space and a vehicle width, and for facilitating an adjustment operation of equalizing the left and right braking forces. Rotary friction plates for braking a differential case and an axle are supported on the differential case and the axle respectively, while stationary friction plates are arranged axially and alternately with respect to the rotary friction plates and are supported non-rotatably on a gear case to brake the differential case and the axle at once by the operation of a single operating arm. A brake housing is integrally formed in an end wall of the gear case. The end wall, through which the axle passes, has an opening from which the brake members can be removed and inserted to improve assembly efficiency.

20 Claims, 4 Drawing Sheets

BRAKE SYSTEM FOR VEHICLES

BACKGROUND OF THE INVENTION

1. Field of Invention

The invention relates to a brake system for a vehicle, especially a small vehicle, such as an all-terrain vehicle or a utility vehicle, provided with a differential drive mechanism in a gear case in which a final reduction gear is housed.

2. Description of Related Art

Japanese Patent Laid-Open No. 59-130791/1984 discloses a conventional system as shown in FIG. 5, in which a gear case 101 is provided therein with a large final reduction gear 102, a differential drive mechanism 104 and a wet type multiplate friction brake 105 for braking a differential case 106 alone. The friction brake 105 is provided with a plurality of rotary friction plates 113 spline-fitted in a hub 112, which is fixed to the differential case 106, in such a manner that the rotary friction plates 113 can be axially moved, and a plurality of stationary friction plates 114 spline-fitted in an inner circumferential surface of the gear case 101 so that the stationary friction plates 114 can be axially moved.

There is another conventional system for arranging drum brakes, which are adapted to brake left and right axles independently, on the left and right sides of a gear case. In this system, levers of the respective brakes are combined together into a single operating mechanism, and both the left and right drum brakes are actuated by a single operation.

When a braking operation is carried out in the former conventional system while a vehicle travels straight, the skidding (revolution without load) of one side wheel does not occur since the differential drive mechanism is not operated. However, when a braking operation is carried out while the vehicle turns, the differential drive mechanism is operated to cause a floated wheel to skid (revolve without load) in some cases.

In the latter conventional system, in which drum brakes are arranged on the left and right sides of a gear case, two sets of brake parts, such as drums, shoes and levers, are required. Accordingly the number of parts increase, and a double brake installing space is required. Moreover, it is necessary to adjust the brakes so that balanced left and right braking forces are put forth.

SUMMARY OF THE INVENTION

An object of the invention is to reduce the number of brake parts, a brake installing space and a vehicle width and to facilitate an adjustment operation for equalizing left and right braking forces, by enabling a differential case and one axle to be braked at once with one set of wet type multiplates.

According to one aspect of the invention, there is provided a brake system for vehicles having a gear case wherein a final reduction gear and a differential case of the differential drive mechanism is housed. The brake system includes a first rotary friction plate supported on the differential case, and a second rotary friction plate supported on an axle. The brake system also includes a plurality of stationary friction plates arranged axially alternately with respect to the rotary friction plates. The stationary friction plates are supported non-rotatably on the gear case. The stationary friction plates and the rotary friction plates are pressed at once in a single braking operation to brake the differential case and the axle. It becomes possible to brake both the differential case and one axle at once by a single braking operation, brake the rotation of a differential gear, and brake wheels by equal left and right braking forces without causing one wheel to skid (revolve without load) even while the vehicle is turned.

According to another aspect of the invention, a brake housing is integrally formed with an end wall of the gear case, and the end wall, through which the axle passes, has an opening from which the rotary friction plates and the stationary friction plates are removed and inserted. Various brake parts, such as rotary friction plates, can be set in the brake housing through the opening in a side portion of the gear case, so that assembly and disassembly of the brake system can be carried out simply.

According to another aspect of the invention, the number of the first rotary friction plates is set larger than the number of the second rotary friction plates so that a differential case braking force is larger than an axle braking force. The braking force for the differential case which substantially works to brake the vehicle is set large, and that for the axle which works to prevent the differential gear from rotating idly is set small, so that the braking force can be efficiently used.

These objects as well as other objects, features and advantages of the invention will become more apparent to those skilled in the art from the following description with reference to the accompanying drawings.

DETAILED DESCRIPTION OF PREFERRED EMBODIMENTS

Figure 1:
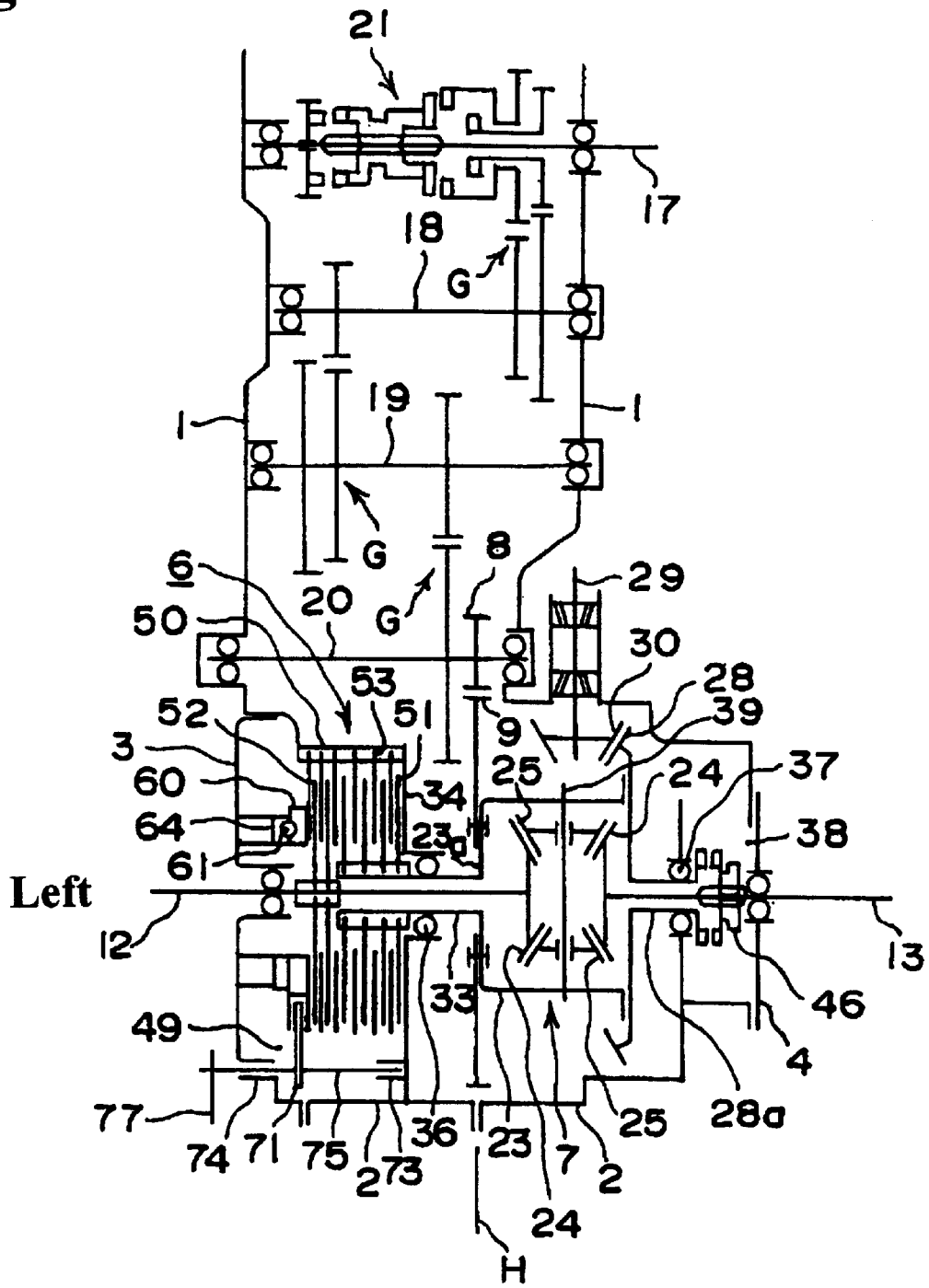
FIG. 1 is a diagram of a power transmission mechanism for a small vehicle to which this invention is applied.

FIG. 1 is a diagram of a power transmission mechanism for a small vehicle, such as an all-terrain vehicle or a utility vehicle, provided with a brake system according to the invention. A rear gear case 2, in which a differential drive mechanism 7, a large final reduction gear 9 and left and right rear axles 12, 13 are housed, is integrally formed with transmission cases 1, 2 and each of the two cases 1, 2 have left-and-right-divided structures with a mating face H therebetween. An axial left end wall of the gear case 2 is provided with a partition wall 34 for a brake and a brake housing 50 thereon so that the wall 34 and the housing 50 are integral therewith, and has a large opening 49 therein from which brake parts can be inserted and removed. The opening 49 is provided with a detachable left cover 3. In a right end wall of the gear case 2, an opening 38 is formed for inserting a diff-lock member 46 therethrough, and a right cover 4 is detachably mounted over the opening 38.

The transmission case 1 is provided therein with a transmission input shaft 17 operatively connected to a prime mover (not shown in the drawings) via a belt type non-stage transmission, intermediate shafts 18, 19 and a transmission output shaft 20. The shafts 17, 18, 19, 20 are provided thereon with a plurality of groups of speed change gears G and an advancing-backing change clutch 21. The power inputted by the transmission input shaft 17 is transmitted to the output shaft 20 via a suitable group of gears G having a desired gear ratio, and the resultant power is transmitted from a small final reduction gear 8 mounted fixedly on the transmission output shaft 20 to the large final reduction gear 9.

A wet type multiplate braking system 6 is arranged at a left side portion of the gear case 2 with the large final reduction gear 9 and the differential drive mechanism 7, and the diff-lock member 46 is arranged at a right side portion thereof. Left and right rear axles 12, 13 are inserted from the left and right sides of the gear case 2 and are supported thereby.

The differential drive mechanism 7, of which the basic structure is well known, includes a differential case 23 with which the large final reduction gear 9 is combined firmly, left and right large differential gears 24 provided in the differential case 23, and a pair of small differential gears 25 meshed with the two large differential gears 24 at right angles thereto. The large differential gears 24 are fixed by spline-fitting to inner end portions of the left and right rear axles 12, 13, and the small differential gears 25 are supported rotatably in a right-angled posture with respect to the axes of the rear axles 12, 13 on a support shaft 39 fixed to the differential case 23.

A boss 33 is integrally formed with the differential case 23 at a left end portion thereof and extends from the end wall 23a of the differential case 23 to the left. A large front wheel driving power take-off gear 28 is fixed to the differential case 23 at a right end portion thereof. The differential case 23 is rotatably supported on the gear case 2 via a bearing 37 fitted in an outer circumferential portion of a boss portion 28a of the large gear 28, and a bearing 36 fitted in an outer circumferential portion of the left boss 33. The large front wheel driving power take-off gear 28 is meshed with a small front wheel driving power take-off gear 30 mounted fixedly on a front wheel driving power take-off shaft 29.

Figure 2:
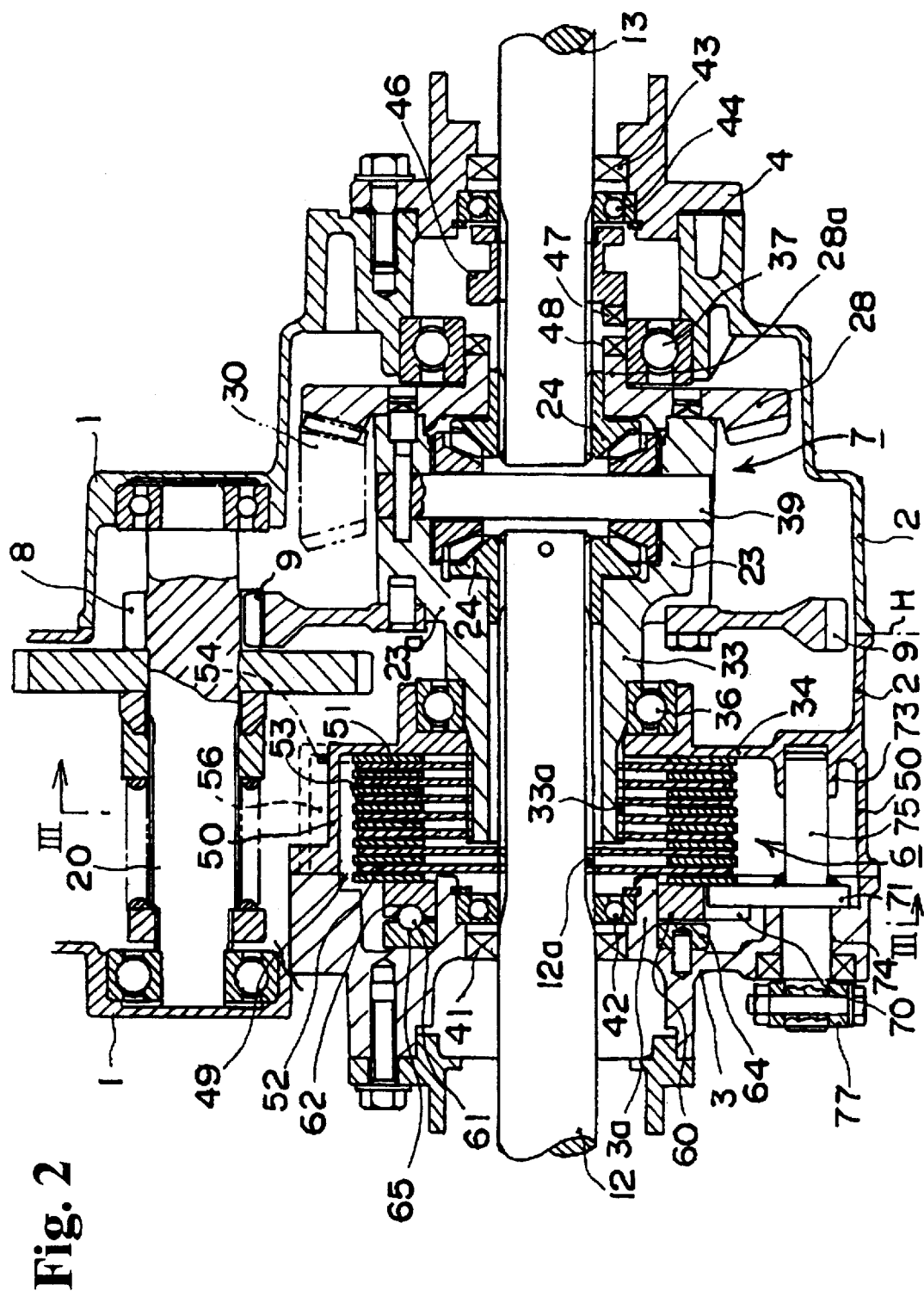
FIG. 2 is an enlarged horizontal sectional view of a gear case.

FIG. 2 shows an enlarged horizontal section of the gear case 2. The left rear axle 12 is inserted in a seal 41 and a bearing 42 which are fitted in the left cover 3, passes through the interior of the boss 33, projects into the interior of the differential case 23, and is spline-fitted into the left large differential gear 24 as described above. The right rear axle 13 is inserted in a seal 43 and a bearing 44 which are fitted in the right cover 4, passes through the boss portion 28a of the large front wheel driving power take-off gear 28, projects into the interior of the differential case 23, and is spline-fitted into the right large differential gear 24 as described above.

The diff-lock member 46 has dog teeth 47 on the left end thereof, and is spline-fitted around an outer circumference of the right rear axle 13 so that the diff-lock member 46 can be axially moved. The dog teeth 47 are axially opposed to dog teeth 48 formed on the boss portion 28a of the large front wheel driving power take-off gear 28. When the diff-lock member 46 is moved to the left, the dog teeth 47, 48 are meshed with each other, so that the differential drive mechanism is locked.

Regarding the structure of the brake system 6, the boss 33 of the differential case 23 is supported on an inner circumferential end portion of a brake supporting partition wall 34, which is integral with the gear case 2, via the left bearing 36. The boss 33 projects into the interior of the brake housing 50, and spline teeth 33a are formed on an outer circumferential surface of the portion of the boss 33 which projects thereinto. A plurality of rotary friction plates 51 for the differential case 23 are spline-fitted onto the spline teeth 33a so that the rotary friction plates 51 can only be moved axially. An outer circumferential surface of an inner end portion of the left rear axle 12 is provided with outer circumferential spline teeth 12a extending from an inner end of the same axle to the left cover 3. Rotary friction plates 52 for the rear axles are spline-fitted with the spline teeth 12a between the left end surface of the boss 33 and the left cover 3, so that the rotary friction plates 52 can only be moved axially. The number of the friction plates 51 for the differential case 23 is larger than that of the friction plates 52 for the rear axles. For example, the number of the rotary friction plates 51 for the differential case is set to five, while the number of the rotary friction plates 52 for the rear axles is set to two in this embodiment. Accordingly, the braking force for the differential case 23 becomes larger than that for the rear axles.

Figure 3:
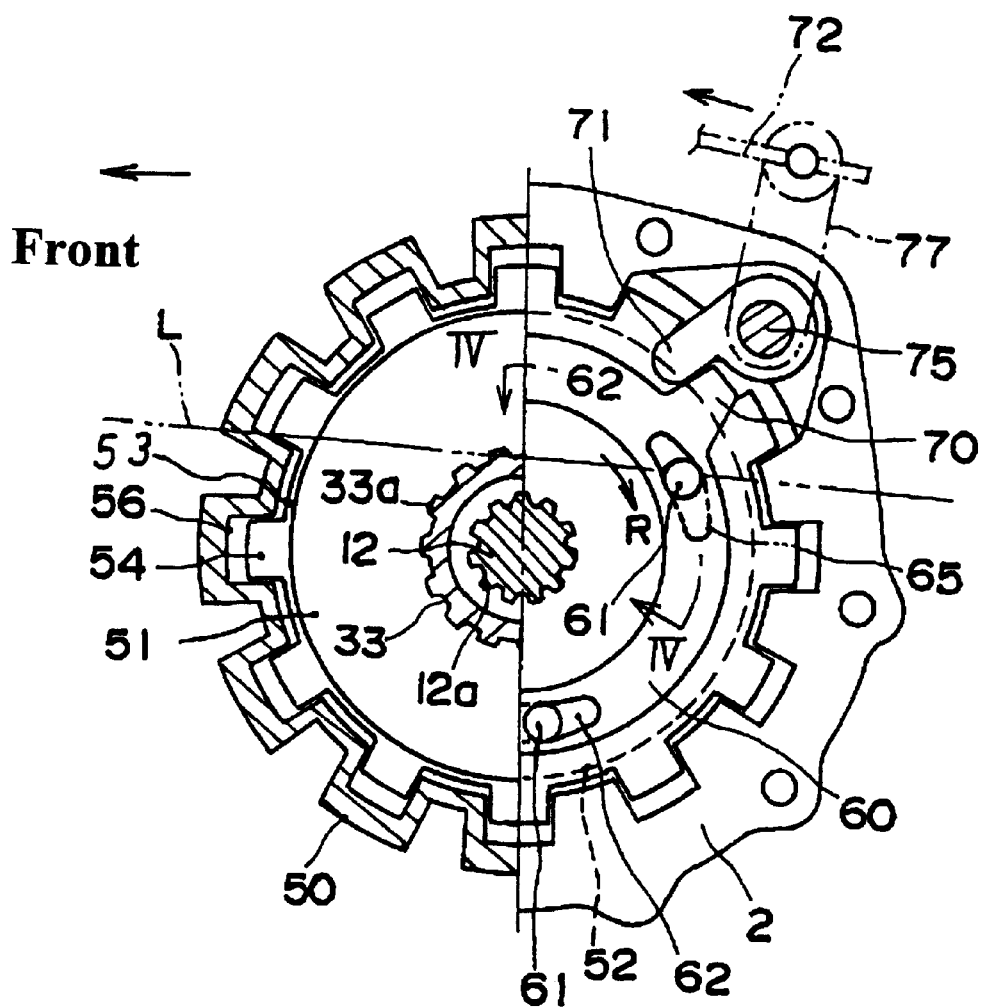
FIG. 3 is a sectional view taken along the line III—III in FIG. 2.

Stationary friction plates 53 are arranged between the rotary friction plates 51, 52 and at both outsides of the sets of the rotary friction plates 51, 52, and have a plurality of circumferentially spaced, outwardly extending projections 54 integral therewith. As shown in FIG. 3, the projections 54 are engaged with axial grooves 56 formed in an inner circumferential surface of the brake housing 50 so that the projections 54 can only be moved axially. The stationary friction plate 53 at the extreme right position is oppositely disposed to the brake supporting partition wall 34, and the stationary friction plate 53 at the extreme left position is oppositely disposed to a pressure cam ring 60. The cam ring 60 is fitted in an outer circumferential surface of the boss portion 3a formed on the left cover 3 so that the cam ring 60 can be turned and be axially moved, the cam ring 60 being engaged with a left fixing ring 64 via steel balls 61 for the cam. The fixing ring 64 is fixed to the left cover 3.

Figure 4:
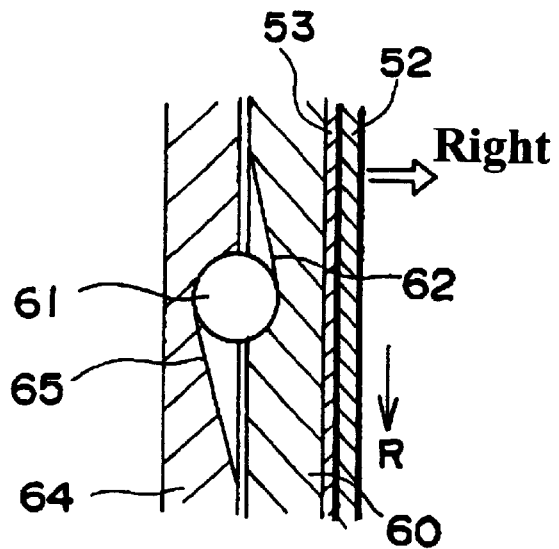
FIG. 4 is an enlarged sectional view taken along the line IV—IV in FIG. 3.
Figure 5:
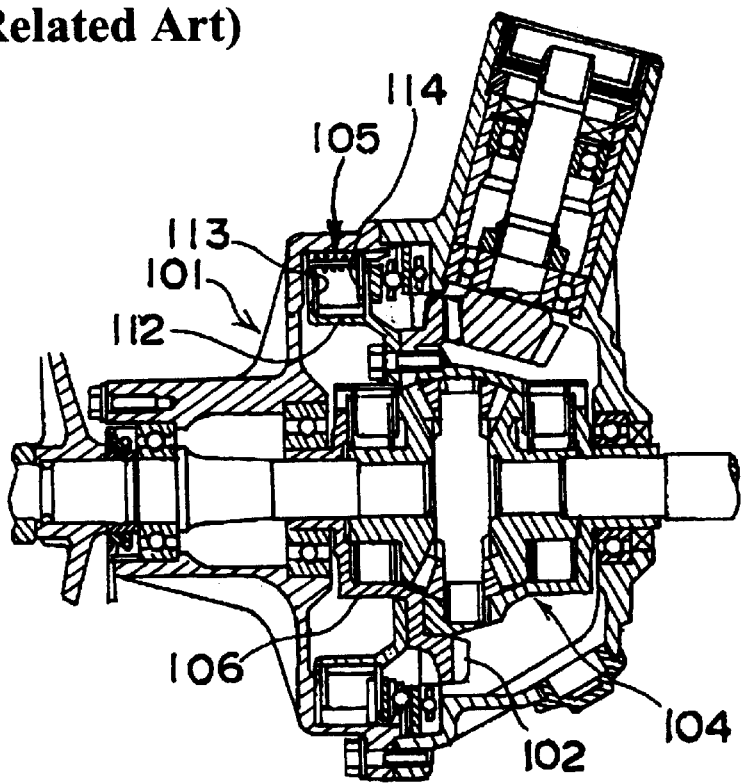
FIG. 5 is a horizontal sectional view of a conventional system.

FIG. 4 is a sectioned development (enlarged sectional view taken along the line IV—IV in FIG. 3) showing the cam ring 60 and the fixing ring 64 cut in the circumferential direction. The cam ring 60 has a movable cam groove 62 in a left end surface thereof, and the fixing ring 64 has a fixed groove 65 in a right end surface thereof. A steel ball 61 is held between the grooves 62,65 so that the steel ball 61 can be rolled. The depth of the movable cam groove 62 of the cam ring 60 decreases in the direction opposite to the direction of an arrow R, while the depth of the fixed cam groove 65 of the fixing ring 64 decreases in the direction of the arrow R. When the cam ring 60 is turned in the direction of the arrow R with respect to the fixing ring 64, the cam ring 60 is moved to the right via the steel ball 61 to press all stationary friction plates 53 and all rotary friction plates 51, 52 between the brake supporting partition wall 34 and cam ring 60. Namely, the differential case 23 and left rear axle 12 are braked simultaneously via the rotary friction plates 51, 52.

Referring to FIG. 3, is a sectional view taken along the line III—III in FIG. 2, an outwardly extending projection 70 is formed on the cam ring 60, and an operating arm 71 is engaged with the projection 70 in the direction opposite to the arrow R. The operating arm 71 is fixedly mounted on a brake shaft 75, which is supported by a boss 73 formed on the brake supporting partition wall 34 and by a support hole 74 of the left cover 3 so that the brake shaft 75 can be turned, and which projects to the outside of the left cover 3 with a brake arm 77 fixedly mounted on an outer end portion thereof, as shown in FIG. 2. An operating wire or rod 72 is joined to the brake arm 77 as shown in FIG. 3, and to a brake operator, such as a brake pedal, and urged backward by a return spring. Namely, when the brake arm 77 is turned forward against the return spring by the operating wire 72 (leftward in FIG. 3), the cam ring 60 is turned in the direction of the arrow R via the brake shaft 75, operating arm 71 and projection 70.

The brake housing 50 stores an oil up to, for example, a level L so that the friction brake is of the wet type. An engine oil is used as the oil, which is stored in a space from the interior of the transmission case 1 to the entire interior of the gear case 2 of FIG. 1.

The operation of the differential drive mechanism 7 is well known. Referring to FIG. 1, the large final reduction gear 9 and differential case 23 are rotated together via the small final reduction gear 8, and also the left and right rear axles 12, 13 are rotated at the same time via the support shaft 39, small differential gears 25 and large differential gears 24. When the loads on the left and right rear wheels are approximately equal, the left and right wheels are rotated at an equal speed, and when a difference between the left and right loads is large, for example during a turning movement of the vehicle, a differential motion is made by the rotation of the small differential gears 25 around their axis.

In order to brake the rear wheels, a brake operator such as a brake pedal, is operated to cause the cam ring 60 to be turned in the direction of the arrow R via the operating wire 72, the brake arm 77, the brake shaft 75, the operating arm 71 and the projection 70, which are shown in FIG. 3, and the cam ring 60 is then moved to the right, as shown in FIG. 4, by cam actions of the cam grooves 62, 65 and the steel balls 61. Consequently, the friction plates 51, 52, 53 are pressed between the cam ring 60 and the brake supporting partition wall 34 to brake the differential case 23 and left rear axle 12 at the same time. Namely, the left rear axle 12 is braked with respect to the gear case 2 and also with respect to the differential case 23, so that the rotation of the small differential gears 25 around their axis, i.e. around the support shaft 39 is restricted, whereby the right rear axle 13 is also braked via the small differential gears 25.

Accordingly, the two rear axles 12, 13 can be braked without operating the differential drive mechanism 7 even while the vehicle turns, not to mention the case when the vehicle travels straight.

In order to assemble the brake system, the rotary friction plates 51, 52 and the stationary friction plates 53 are inserted from the left end opening 49 of the gear case 2 into the interior of the brake housing 50 before fixing the left cover 3, shown in FIG. 2. The left cover 3 on which the fixing ring 64, the cam ring 60 and the brake shaft 74 are mounted in advance, is then fixed to the left end opening 49 of the brake housing 50.

In the embodiment of FIG. 2, the ratio of the numbers of the rotary friction plates 51, 52 mounted on the differential case 23 and the rear axle 12 is set to 5:2, however the ratio is not limited to the value. Although the number of the rotary friction plates 51 on the differential case 23 is preferably larger than that of the rotary friction plates 52 on the rear axle 12, it can be set equal to the number of the friction plates on the rear axle 12. This invention can also be used as a brake system for front wheels.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A brake system housed in a vehicle having a gear case in which a final reduction gear and a differential case of a differential drive mechanism are housed, comprising:
   at least one first rotary friction plate supported on the differential case,
   at least one second rotary friction plate supported on an axle, and
   a plurality of stationary friction plates arranged axially alternately with respect to the at least one first and the at least one second rotary friction plates, the stationary friction plates supported non-rotatably on the gear case,
   whereby the stationary friction plates and the at least one first and the at least one second rotary friction plates are pressed at once in a single braking operation to brake the differential case and the axle.

2. The brake system of claim 1, wherein a brake housing is integrally formed with an end wall of the gear case, and the end wall, through which the axle passes, has an opening from which the at least one first and the at least one second rotary friction plates and the plurality of stationary friction plates are removed and inserted.

3. The brake system of claim 1, wherein a number of first rotary friction plates of the at least one first rotary friction plate is set larger than a number of second rotary friction plates of the at least one second rotary friction plate so that a differential case braking force is larger than an axle braking force.

4. A vehicle brake system housed in a casing, comprising:
   a brake housing formed in an end of the casing, the brake housing having a closed end and an open end;
   a cover mounted to the open end of the brake housing;
   a differential case rotatably mounted in the casing;
   an axle rotatably mounted in an opening in the cover;
   at least one first rotary friction plate mounted to the differential case;
   at least one second rotary fiction plate mounted to the axle; and
   a plurality of stationary friction plates mounted to the brake housing such that a stationary friction plate alternates with a rotary friction plate, whereby pressing together of the plurality of stationary friction plates and the at least one first friction plate and the at least one second friction plate brakes both the differential case and the axle.

5. The vehicle brake system according to claim 4, further comprising:
   a fixing ring mounted to the cover;
   a cam ring rotatably mounted opposite the fixing ring; and
   a plurality of ball bearings mounted between the fixing ring and the cam ring, wherein each ball bearing of the plurality of ball bearings is seated in opposing sloped cam grooves in the fixing ring and in the cam ring.

6. The vehicle brake system according to claim 5, wherein the sloped cam grooves in the fixing ring descend in a first direction and the sloped cam grooves in the cam ring descend in an opposite, second direction, the brake system not being applied when a deepest part of the sloped cam grooves in the fixing ring and the cam ring oppose one another.

7. The vehicle brake system according to claim 6, further comprising an operating arm rotatably mounted between the cover and a wall performing the closed end of the brake housing, wherein the cam ring has a projection extending from an outer circumference that is in contact with a side of the operating arm, whereby rotation of the operating arm rotates the cam ring to bring about the pressing together of the plurality of the stationary friction plates and the at least one first rotary friction plate and the at least one second rotary friction plate.

8. The vehicle brake system according to claim 4, wherein the differential case has a boss extending into the closed end of the brake housing, the at least one rotary friction plate fitted to the boss to rotate with the differential case.

9. The vehicle brake system according to claim 8, wherein the axle extends through an axial opening in the boss and into the differential case, the at least one second rotary friction plate fitted to the axle to rotate therewith.

10. The vehicle brake system according to claim 9, wherein the at least one first rotary friction plate is axially slidable on the boss and the at least one second rotary friction plate is axially slidable on the axle.

11. The vehicle brake system according to claim 4, wherein the at least one first rotary friction plate comprises M first rotary friction plates and the at least one second rotary friction plate comprises N second rotary friction plates.

12. The vehicle brake system according to claim 11, wherein M>N.

13. The vehicle brake system according to claim 11, wherein M=5 and N=2.

14. A vehicle brake system, comprising:
   a brake housing formed in an end of a casing, the brake housing having a closed end and an open end;
   a cover mounted to the open end of the brake housing;
   a differential case rotatably mounted in the casing;
   an axle rotatably mounted in an opening in the cover;
   at least one first rotary friction plate mounted to the differential case;
   at least one second rotary friction plate mounted to the axle; and
   a plurality of stationary friction plates mounted to the brake housing such that a stationary friction plate of the plurality of stationary friction plates alternates with a rotary friction plate of the at least one first rotary friction plate and the at least one second rotary friction plate, whereby pressing together of the plurality of stationary friction plates and the at least one first friction plate and the at least one second friction plate brakes both the differential case and the axle;
   a fixing ring mounted to the cover;
   a cam ring rotatably mounted opposite the fixing ring;
   a plurality of ball bearings mounted between the fixing ring and the cam ring, wherein each ball bearing of the plurality of ball bearings is seated in opposing sloped cam grooves in the fixing ring and in the cam ring; and
   an operating arm rotatably mounted between the cover and a wall forming the closed end of the brake housing, wherein the cam ring has a projection extending from an outer circumference that is in contact with a side of the operating arm, whereby rotation of the operating arm rotates the cam ring to bring about the pressing together of the plurality of the stationary friction plates and the at least one first rotary friction plate and the at least one second rotary friction plate.

15. The vehicle brake system according to claim 14, wherein the sloped cam grooves in the fixing ring descend in a first direction and the sloped cam grooves in the cam ring descend in an opposite, second direction, the brake system not being applied when a deepest part of the sloped cam grooves in the fixing ring and the cam ring oppose one another.

16. The vehicle brake system according to claim 14, wherein the differential case has a boss extending into the closed end of the brake housing, the at least one rotary friction plate fitted to the boss to rotate with the differential case.

17. The vehicle brake system according to claim 16, wherein the axle extends through an axial opening in the boss and into the differential case, the at least one second rotary friction plate fitted to the axle to rotate therewith.

18. The vehicle brake system according to claim 14, wherein the at least one first rotary friction plate comprises M first rotary friction plates and the at least one second rotary friction plate comprises N second rotary friction plates.

19. The vehicle brake system according to claim 18, wherein M>N.

20. The vehicle brake system according to claim 19, wherein M=5 and N=2.

* * * * *